United States Patent
Yu et al.

(10) Patent No.: US 12,482,455 B2
(45) Date of Patent: Nov. 25, 2025

(54) SYSTEMS AND METHODS FOR TRAINING DUAL-MODE MACHINE-LEARNED SPEECH RECOGNITION MODELS

(71) Applicant: Google LLC, Mountain View, CA (US)

(72) Inventors: Jiahui Yu, Jersey City, NJ (US); Ruoming Pang, New York, NY (US); Wei Han, Mountain View, CA (US); Anmol Gulati, New York, NY (US); Chung-Cheng Chiu, Mountain View, CA (US); Bo Li, Fremont, CA (US); Tara N. Sainath, Jersey City, NJ (US); Yonghui Wu, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 295 days.

(21) Appl. No.: 18/011,571

(22) PCT Filed: Oct. 1, 2021

(86) PCT No.: PCT/US2021/053128
§ 371 (c)(1),
(2) Date: Dec. 20, 2022

(87) PCT Pub. No.: WO2022/072801
PCT Pub. Date: Apr. 7, 2022

(65) Prior Publication Data
US 2023/0237993 A1    Jul. 27, 2023

Related U.S. Application Data

(60) Provisional application No. 63/086,937, filed on Oct. 2, 2020.

(51) Int. Cl.
*G10L 15/16*    (2006.01)
*G10L 15/22*    (2006.01)
*G10L 15/32*    (2013.01)

(52) U.S. Cl.
CPC .............. *G10L 15/16* (2013.01); *G10L 15/22* (2013.01); *G10L 15/32* (2013.01)

(58) Field of Classification Search
CPC .......... G10L 15/16; G10L 15/22; G10L 15/32
See application file for complete search history.

(56) References Cited

U.S. PATENT DOCUMENTS

| | | | | | |
|---|---|---|---|---|---|
| 6,122,613 A | * | 9/2000 | Baker | ..................... | G10L 15/22 |
| | | | | | 704/E15.04 |
| 8,880,398 B1 | * | 11/2014 | Aleksic | ................... | G10L 15/07 |
| | | | | | 704/235 |

(Continued)

FOREIGN PATENT DOCUMENTS

WO    WO 2014/055076    4/2014

OTHER PUBLICATIONS

International Search Report for Application No. PCT/US2020/053128, mailed on Apr. 5, 2022, 7 pages.

(Continued)

*Primary Examiner* — Mark Villena
(74) *Attorney, Agent, or Firm* — DORITY & MANNING P.A.

(57) ABSTRACT

Systems and methods of the present disclosure are directed to a computing system, including one or more processors and a machine-learned multi-mode speech recognition model configured to operate in a streaming recognition mode or a contextual recognition mode. The computing system can perform operations including obtaining speech data and a ground truth label and processing the speech data using the contextual recognition mode to obtain contextual prediction data. The operations can include evaluating a difference between the contextual prediction data and the ground truth label and processing the speech data using the streaming recognition mode to obtain streaming prediction data. The operations can include evaluating a difference (Continued)

between the streaming prediction data and the ground truth label and the contextual and streaming prediction data. The operations can include adjusting parameters of the speech recognition model.

21 Claims, 8 Drawing Sheets

(56) References Cited

U.S. PATENT DOCUMENTS

| | | | | |
|---|---|---|---|---|
| 11,043,222 | B1* | 6/2021 | Eagan | G10L 15/26 |
| 11,087,766 | B2* | 8/2021 | Umesh | G10L 15/22 |
| 11,763,806 | B1* | 9/2023 | Chen | G10L 17/14 |
| | | | | 704/251 |
| 11,854,535 | B1* | 12/2023 | Zhang | G10L 15/18 |
| 2008/0189111 | A1 | 8/2008 | Ruback et al. | |
| 2013/0346077 | A1* | 12/2013 | Mengibar | G10L 15/197 |
| | | | | 704/235 |
| 2015/0039299 | A1* | 2/2015 | Weinstein | G10L 15/16 |
| | | | | 704/202 |
| 2017/0372199 | A1* | 12/2017 | Hakkani-Tur | G06N 3/044 |
| 2018/0061409 | A1* | 3/2018 | Valentine | G10L 15/20 |
| 2018/0157638 | A1* | 6/2018 | Li | G06F 40/35 |
| 2019/0279614 | A1* | 9/2019 | Ye | G10L 15/187 |
| 2019/0348065 | A1* | 11/2019 | Talwar | G10L 25/78 |
| 2019/0370685 | A1* | 12/2019 | Xie | H04L 67/303 |
| 2019/0371311 | A1* | 12/2019 | Patel | G06F 3/167 |
| 2020/0074986 | A1* | 3/2020 | Kwon | G10L 15/063 |
| 2020/0075044 | A1* | 3/2020 | Jankowski, Jr. | G10L 17/04 |
| 2020/0160838 | A1* | 5/2020 | Lee | G10L 15/183 |
| 2020/0243094 | A1* | 7/2020 | Thomson | G10L 15/28 |
| 2020/0273089 | A1* | 8/2020 | Siefken | G10L 17/00 |
| 2021/0020175 | A1* | 1/2021 | Shao | G10L 15/22 |
| 2021/0104245 | A1* | 4/2021 | Aguilar Alas | G10L 15/16 |
| 2021/0110258 | A1* | 4/2021 | Lee | G10L 15/063 |
| 2021/0358496 | A1* | 11/2021 | Sukumar | G10L 13/047 |

OTHER PUBLICATIONS

International Preliminary Report on Patentability for Application No. PCT/US2021/053128, mailed Apr. 13, 2023, 12 pages.

* cited by examiner

SYSTEMS AND METHODS FOR TRAINING DUAL-MODE MACHINE-LEARNED SPEECH RECOGNITION MODELS

CROSS-REFERENCE TO RELATED APPLICATIONS

This application is based upon and claims the right of priority under 35 U.S.C. § 371 to International Application No. PCT/US2021/053128 filed on Oct. 1, 2021, which claims priority to and the benefit of U.S. Provisional Patent Application No. 63/086,937, filed Oct. 2, 2020. Applicant claims priority to and the benefit of each of such applications and incorporates all such applications herein by reference in its entirety.

FIELD

The present disclosure relates generally to speech recognition. More particularly, the present disclosure relates to training and utilization of dual-mode, machine-learned speech recognition models.

BACKGROUND

Speech recognition technologies have become increasingly important to bridge the gap in communication between human and machine. Low-latency streaming speech recognition (e.g., online speech recognition, iterative speech recognition, etc.) is utilized in a number of scenarios in which it is important to recognize each word as quickly as possible as they are spoken (e.g., virtual assistant tasks, etc.). While low-latency streaming recognition is generally preferred for many speech recognition scenarios, it often suffers from prediction inaccuracy (e.g., high word error rate, etc.). For scenarios in which accuracy is key (e.g., offline video captioning on video-sharing platforms, etc.), fully contextual speech recognition technologies are generally preferred. In fully contextual speech recognition, an entire speech segment is provided as input so that earlier portions of the speech can be processed with the benefit of later-occurring context.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for utilization of a multi-mode speech recognition model. The method can include obtaining, by a computing system comprising one or more computing devices, a machine-learned multi-mode speech recognition model configured to operate in a streaming recognition mode or a contextual recognition mode, wherein the streaming recognition mode is configured to iteratively encode each of one or more portions of speech data, and wherein the contextual recognition mode is configured to concurrently encode each of the one or more portions of the speech data. The method can include obtaining, by the computing system, speech data that corresponds to a speech recognition task. The method can include determining, by the computing system based on the speech recognition task, a selected mode from the streaming recognition mode and the contextual recognition mode of the machine-learned multi-mode speech recognition model. The method can include processing, by the computing system, the additional speech data using the selected mode of the machine-learned multi-mode speech recognition model to obtain a speech recognition output.

Another example aspect of the present disclosure is directed to a computing system for training a machine-learned model for multi-mode speech recognition. For example, the computer system may be for training a machine-learned model for multi-mode speech recognition as set out in the above aspect. The computing system can include one or more processors. The computing system can include a machine-learned multi-mode speech recognition model configured to operate in a streaming recognition mode or a contextual recognition mode. The streaming recognition mode can be configured to iteratively encode each of one or more portions of speech data to obtain streaming prediction data (e.g., in a causal fashion). The contextual recognition mode can be configured to concurrently encode each of the one or more portions of the speech data to obtain contextual prediction data (e.g., in a non-causal fashion). The computing system can include one or more tangible, non-transitory computer readable media storing computer-readable instructions that when executed by the one or more processors cause the one or more processors to perform operations. The operations can include obtaining the speech data and an associated ground truth label. The operations can include processing the speech data using the contextual recognition mode of the machine-learned multi-mode speech recognition model to obtain contextual prediction data. The operations can include evaluating a contextual loss function that evaluates a difference between the contextual prediction data and the ground truth label. The operations can include processing the speech data using the streaming recognition mode of the machine-learned multi-mode speech recognition model to obtain streaming prediction data. The operations can include evaluating a streaming loss function that evaluates a difference between the streaming prediction data and the ground truth label and a difference between the contextual prediction data and the streaming prediction data. The operations can include adjusting one or more parameters of the machine-learned multi-mode speech recognition model based at least in part on the contextual loss function and the streaming loss function.

Another example aspect of the present disclosure is directed to one or more tangible, non-transitory computer readable media storing computer-readable instructions that when executed by one or more processors cause the one or more processors to perform operations. The operations can include obtaining a machine-learned multi-mode speech recognition model configured to operate in a streaming recognition mode or a contextual recognition mode, wherein the streaming recognition mode is configured to iteratively encode each of one or more portions of speech data, and wherein the contextual recognition mode is configured to concurrently encode each of the one or more portions of the speech data. The operations can include obtaining speech data that corresponds to a speech recognition task. The operations can include determining, based on the speech recognition task, a selected mode from the streaming recognition mode and the contextual recognition mode of the machine-learned multi-mode speech recognition model. The operations can include processing the additional speech data using the selected mode of the machine-learned multi-mode speech recognition model to obtain a speech recognition output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
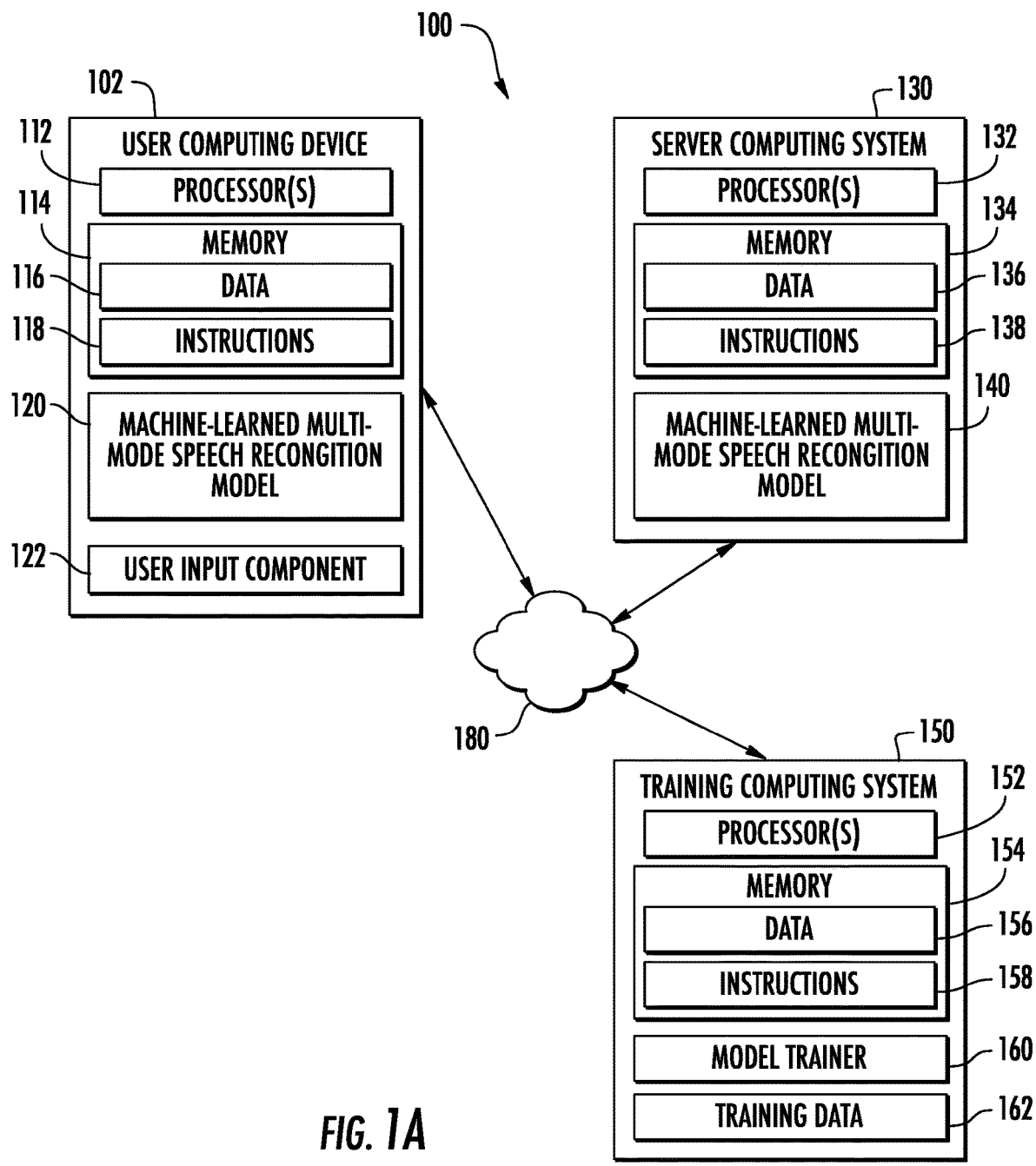
FIG. 1A depicts a block diagram of an example computing system that performs multi-mode speech recognition according to examples described in the present disclosure.

Reference numerals that are repeated across plural figures are intended to identify the same features in various implementations.

DETAILED DESCRIPTION

Overview

Generally, the present disclosure is directed to speech recognition. More particularly, the present disclosure relates to training and utilization of multi-mode, machine-learned speech recognition models. As an example, a multi-mode machine-learned speech recognition model can be configured to operate in two modes: a streaming recognition mode or a contextual recognition mode. The streaming recognition mode can be configured to iteratively encode portions of speech data to obtain streaming prediction data (e.g., online encoding of a sentence included in the speech data word-by-word as it is spoken/streamed, etc.). On the other hand, the contextual recognition mode can be configured to concurrently encode the portions of the speech data to obtain contextual prediction data (e.g., offline encoding all portions of the speech data concurrently, etc.). The machine-learned multi-mode speech recognition model can encode speech data using either mode, and can switch between modes based on the speech recognition task associated with the speech data (e.g., processing a virtual assistant task using the streaming recognition mode, processing a video captioning task using the contextual recognition mode, etc.). In such fashion, the machine-learned multi-mode speech recognition model can be utilized to perform both streaming and contextual speech recognition, therefore eliminating the need to design, train, and utilize separate models for various modes of speech recognition.

In some implementations, the speech data can be or otherwise include spectrographic data (e.g., obtained utilizing a spectrograph, etc.). Alternatively, or additionally, in some implementations, the speech data can be or otherwise include audio data (e.g., phonemes, raw waveforms, raw audio, etc.). For example, the speech data can be raw audio captured with an audio capture device. For another example, the speech data can be raw waveform data collected via a waveform capture device. As such, it should be noted that the speech data can be, include, or be based on any data associated with the collection and/or analysis of speech.

Additionally, in some implementations, both modes of the machine-learned multi-mode speech recognition model can be trained in a manner that distills the performance of the contextual recognition mode to further optimize the streaming recognition mode. As an example, speech data can be obtained alongside an associated ground truth label (e.g., a ground truth textual transcription of speech included in the speech data, etc.). The speech data can be processed using the contextual recognition mode of the machine-learned multi-mode speech recognition model to obtain contextual prediction data (e.g., a prediction fully considering each portion of the speech data, etc.). A contextual loss function can be evaluated that evaluates a difference between the contextual prediction data and the ground truth label. Next, the speech data can be processed using the streaming recognition mode of the machine-learned multi-mode speech recognition model to obtain streaming prediction data (e.g., a prediction that iteratively considers each portion of the speech data, etc.). A streaming loss function can be evaluated that evaluates a difference between the streaming prediction data and the ground truth label. Further, the loss streaming loss function can evaluate a difference between the contextual prediction data and the streaming prediction data (e.g., a distillation loss based on the more accurate processing of the contextual recognition mode, etc.). Parameters of the model can be adjusted based on both loss functions. In such fashion, the higher accuracy prediction of the contextual recognition mode can be leveraged as a distillation training signal, therefore improving both the accuracy and emission latency of the streaming recognition mode.

In particular, in some examples, a loss function can be evaluated that evaluates a contextual loss term and a streaming loss term. For example, the streaming loss term can evaluate the difference between the streaming prediction data and the ground truth label, and the contextual loss term can evaluate the difference between the contextual prediction data and the ground truth label. The parameter(s) of the model can be adjusted based on the loss function. Additionally, in some implementations, the loss function can include a distillation term. The distillation term can evaluate the difference between the contextual prediction data and the streaming distillation data. In such fashion, the contextually accurate predictive accuracy of the contextual recognition mode can be distilled to the streaming recognition mode.

More particularly, a computing system can include a machine-learned multi-mode speech recognition model. The machine-learned multi-mode speech recognition model (e.g., an encoder, encoder and decoder, etc.) can be or otherwise include one or more neural networks (e.g., deep neural networks) or the like. Neural networks (e.g., deep neural networks) can be feed-forward neural networks, convolutional neural networks, recurrent neural networks (e.g., RNN-T, etc.), and/or various other types of neural networks. As an example, the machine-learned multi-mode speech recognition model can include a plurality of machine-learned layers. These layers can include pointwise operators (e.g., feed-forward net(s), residual connections, activation layers, striding layers, dropout layers, etc.), convolution layer(s), recurrent neural network layer(s), long short-term memory layer(s), average pooling layer(s), self-attention layer(s), transformer layer(s), and/or normalization layer(s).

The machine-learned multi-mode speech recognition model can be configured to operate in a streaming recognition mode or a contextual recognition mode. The streaming recognition mode can be configured to iteratively encode each of one or more portions of speech data to obtain streaming prediction data (e.g., to process speech data in a causal manner, etc.). As an example, the streaming recognition mode can iteratively encode the speech data in an auto-regressive manner, with each prediction of the current portion of speech data conditioned on previous portion predictions(e.g., no future speech portion/context is considered when processing a portion of the speech data, etc.).

The contextual recognition mode can be configured to concurrently encode each of the one or more portions of the speech data to obtain contextual prediction data. More particularly, the contextual recognition mode can process each portion of the speech data concurrently so that the processing of any speech portion can affect the processing of another speech portion (e.g., processing the speech data in a causal manner, etc.). As an example, the contextual recognition mode can concurrently encode the speech data in a parallelized manner, with each prediction of the current portion of speech data conditioned on previous portion predictions and future portion predictions (e.g., both past and future speech portion/context is considered when processing a portion of the speech data, etc.).

It should be noted that in some implementations, the machine-learned multi-mode speech recognition model can be an encoder portion of an overall model. As an example, the machine-learned multi-mode speech recognition model can be an encoder of a machine-learned model, and generate an encoding that is or otherwise includes speech prediction data (e.g., streaming prediction data, contextual prediction data, etc.). A decoder of the machine-learned model can process the speech prediction data to obtain a speech recognition output. Alternatively, in some implementations, the machine-learned multi-mode speech recognition model can be or otherwise include an encoder-decoder architecture.

In some implementations, each layer of the machine-learned multi-mode speech recognition model can be a streaming layer or a dual-mode layer. A streaming layer can be configured to operate in the streaming recognition mode, and the dual-mode layer can be configured to operate in either the streaming recognition mode or the contextual recognition model. It should be noted that as the streaming layer does not operate in two modes, a streaming layer does necessarily need to be adjusted or reconfigured when switching modes of the machine-learned multi-mode speech recognition model. More particularly, the functionality of a streaming layer can be agnostic to the currently configured mode of the model, and therefore can be held static regardless of the current mode of the model.

In some implementations, a dual-mode layer can be configured to operate in either the streaming recognition mode (e.g., a non-causal mode, etc.) or a contextual recognition mode (e.g., a non-causal mode, etc.). As an example, the machine-learned multi-mode speech recognition model and each of the dual-mode layers can be configured to operate in the streaming recognition mode. The machine-learned multi-mode speech recognition model can determine the contextual recognition mode as the selected mode (e.g., based on the speech recognition task associated with additional speech data, etc.). In response, each of the dual-mode layers can be switched from the streaming recognition mode to the contextual recognition mode to facilitate contextual recognition using the machine-learned multi-mode speech recognition model.

As an example, at least one dual-mode layer can be or otherwise include a dual-mode convolutional layer. To support the dual-mode nature of the convolutional layer (e.g., streaming and contextual modes with shared weights, etc.), a normal convolution of kernel size k can be constructed that can be applied in the contextual recognition mode. Next, the causal convolution of kernel size $(k+1)/2$ can be mimiced by constructing a Boolean mask and multiplying with the full-context convolution kernel before applying the kernel in the streaming recognition mode. The dual-mode convolutional layer can include $(k-1)/2$ additional parameters to support full-context convolution (k). In comparison, a streaming mode convolution layer can include $((k+1)/2)$ parameters. Although this can introduce parameter overhead in comparison to a standardized convolutional layer, it should be noted that in convolution-based models, these temporal-wise convolution layers only take a tiny amount of total model size (e.g., most of the weights are on 1×1 convolution layers which are pointwise operators, etc.). As such, any parameter overhead introduced through utilization of a dual-mode convolutional layer can be considered negligible.

As another example, at least one dual-mode layer can be or otherwise include a dual-mode pooling layer. A dual-mode pooling layer can include one or more nodes (e.g., a sequential stack of average pooling (through time) layers, feed-forward layers, activation layers, another feed-forward layer, elementwise multiplication layer(s), etc.). To support both modes, the connections between the one or more nodes can be adjusted. As an example, the connections between a first node (e.g., a feed-forward layer, etc.) and a subsequent convolutional layer can be adjusted to instead connect to a different node of the dual-mode pooling layer. It should be noted that the dual-mode average pooling layer can, in some implementations, be parameter-free, thus avoiding the introduction of additional model size. The dual-mode pooling layer can, in some implementations, be trained in parallel in streaming mode, and can easily be implemented (e.g., with a "cumsum" function in TensorFlow, PyTorch, etc.).

As another example, at least one dual-mode layer can be or otherwise include a dual-mode attention layer. Self-attention (e.g., intra-attention, etc.) can be considered an attention mechanism weighting different positions of a single sequence in order to compute a representation of the same sequence. Additionally, the attention layer itself is parameter-free, and can be composed of matrix multiplication of a key and a query. This multiplication can, in some implementations, be followed by a softmax normalization function processed over the keys, before another matrix multiplication with the value. In a streaming recognition mode, the dual-mode attention layer can perform a normalization (e.g., a softmax, etc.) on the "left" context only (e.g., calculating self-attention only from portions of the speech data that have already been processed, etc.). Conversely, in a contextual recognition mode, the normalization can be performed across the entire context of the speech data (e.g., calculating self-attention from every portion of the speech data, etc.).

As another example, at least one dual-mode layer can be or otherwise include a dual-mode normalization layer. A streaming normalization function and a contextual normalization function can be instantiated for the dual-mode normalization layer. Based on the mode of the machine-learned multi-mode speech recognition model, one of the two normalization functions can be used. In such fashion, a dual-mode normalization layer can switch between normalization functions based on the switching of modes of the machine-learned multi-mode speech recognition model (e.g., switching from a batchnorm function to a layernorm function, etc.).

It should be noted that any pointwise operator can be or otherwise be included as a dual-mode layer. A pointwise operator can be or otherwise include a neural network layer that connects input and output neurons within each timestep (e.g., exclusion of across-connections among different timesteps, etc.). For example, these layers can include feed-forward layers, fully-connected layers, 1×1 convolution layers, activation layers (e.g., ReLU, Swish, residual and dense connections, striding layers, dropout layers, elementwise multiplications, etc. Additionally, a number of these layers can be or otherwise be included in a convolutional transformer portion of the machine-learned multi-mode speech recognition model. The convolutional transformer portion can, for example, include a number of dual-mode layers, such as a first half of a feed-forward layer, a multi-head self-attention layer, a convolutional layer, a second half of a feed-forward layer, etc.

A computing system can obtain speech data and an associated ground truth label. The speech data can be training data, and can include a plurality of portions (e.g., segments of the speech data, etc.). As an example, each portion of the speech data may include one or more unit(s) of language (e.g., phoneme(s), grapheme(s), word(s), letter(s), etc.). Additionally, or alternatively, the speech data can be apportioned based on time (e.g., a plurality of tokens corresponding to various time segments, etc.). Additionally, the ground truth label associated with the speech data can be a textual representation of any speech included in the speech data.

The speech data can be processed using the contextual recognition mode of the machine-learned multi-mode speech recognition model to obtain contextual prediction data. The contextual prediction data can be or otherwise include a predicted textual transcription of the speech included in the speech data. For example, the speech data can include a sentence spoken by a user to a virtual assistant application, and the contextual prediction data can include a predicted textual transcription of the sentence. It should be noted that the contextual prediction data can be based on a non-causal (e.g., fully contextual) understanding of the sentence. More particularly, the processing of each portion of the speech data can be based at least in part on any other portion of the speech data, as described previously.

A contextual loss function can be evaluated that evaluates a difference between the contextual prediction data and the ground truth label. The contextual loss function can be or otherwise include a variety of loss function(s), such as mean squared error, likelihood loss, cross entropy loss, hinge loss, and/or various other loss functions.

The speech data can be processed using the streaming recognition mode of the machine-learned multi-mode speech recognition model to obtain streaming prediction data. The streaming prediction data can be or otherwise include a predicted textual transcription of the speech included in the speech data in the same manner as the contextual prediction data. It should be noted that the contextual prediction data can be based on a causal (e.g., non-contextual) understanding of the sentence. More particularly, the processing of each portion of the speech data can be based only on portion(s) of the speech data that have already been processed, as described previously.

A streaming loss function can be evaluated that evaluates a difference between the streaming prediction data and the ground truth label. Further, the streaming loss function can evaluate a difference between the streaming prediction data and the contextual prediction data. The streaming loss function can be or otherwise include a variety of loss function(s), such as mean squared error, likelihood loss, cross entropy loss, hinge loss, and/or various other loss functions.

One or more parameters of the machine-learned multi-mode speech recognition model can be adjusted based at least in part on the contextual loss function and the streaming loss function. For example, the two loss functions can be backpropagated through the model(s) to update one or more parameters of the model(s) (e.g., based on a gradient of the loss function). Gradient descent techniques can be used to iteratively update the parameters over a number of training iterations. Alternatively, in some implementations, the two loss functions can be processed to generate a final loss (e.g., added, averaged, concatenated, etc.), which can be used to adjust the parameter(s) of the model.

More particularly, to train the machine-learned multi-mode speech recognition model given a batch of data in each training iteration, in some implementations one from two model modes can be randomly sampled for training. Alternatively in some implementations, both modes can be trained, and both losses can be aggregated. In the former approach, referred as randomly sampled training, the importance of the streaming recognition mode and the contextual recognition mode can be controlled by setting different sampling probabilities during training. In the latter approach, referred as joint training, importance can also be controlled by assigning different loss weights to balance streaming recognition and contextual recognition modes.

Additionally, as described previously, the knowledge from contextual recognition mode (e.g., a "teacher" mode, etc.) can be distilled into the streaming recognition mode (e.g., a "student" mode, etc.) dynamically within the same universal model (e.g., inplace knowledge distillation, etc.). This distillation can be accomplished through evaluation of the differences between the contextual prediction data and the streaming prediction data by the streaming loss function (e.g., encouraging consistency of predicted token probabilities, etc.). As each iteration generally requires computation of predictions in both modes, the "teacher's" prediction (e.g., the contextual prediction data, etc.) can be utilized without any additional computation or memory cost. This efficient knowledge distillation can be utilized as a KL-divergence between contextual recognition mode (e.g., the "teacher") and the streaming recognition mode (e.g., the "student") over the probability of three parts: $P_{label}$, $P_{blank}$ and $1-P_{label}-P_{blank}$. Generally, the prediction of contextual recognition mode has a lower latency, as the mode has no incentive to delay its output. Thus, the prediction generated by the contextual recognition mode may not necessarily align in time with the streaming mode. As such, time slackness can be utilized by shifting the prediction of the contextual recognition mode one or more frames to the right, therefore improving quality and training stability.

In some implementations, the computing system can obtain additional speech data that corresponds to a speech recognition task (e.g., a transcription task, a closed captioning task, a virtual assistant task, a security recognition task, a speech analysis task, a bandwidth constrained task, a latency-constrained task, a voice recognition task, etc.). Based on the speech recognition task, a selected mode can be determined from the streaming recognition mode and the contextual recognition mode of the machine-learned multi-mode speech recognition model. As an example, the speech recognition task can be associated with a speech instruction received at a virtual assistant device. Based on the task, the selected mode can be determined to be the streaming recognition mode. As an example, the speech recognition task can be associated with an offline transcription of a newly released movie for captioning. Based on the task, the selected mode can be determined to be the contextual recognition mode. The additional speech data can be processed using the selected mode of the machine-learned multi-mode speech recognition model to obtain a speech recognition output.

In some implementations, the computing system can, in response to obtaining the speech recognition output, perform one or more actions based at least in part on the speech recognition output. As an example, if the speech recognition output includes a transcription of instruction(s) to a virtual assistant application, the virtual assistant application can perform or be instructed to perform the transcribed instruction(s) (e.g., to add a calendar entry, to return the current time or weather, etc.). As another example, if the speech recognition output includes captions for an audio file associated with a video, the computing system can provide the captions to a video display application so that the captions can be overlaid on top of the video. As such, the computing system can perform any action associated with the speech recognition task to facilitate completion of the speech recognition task.

In some implementations, the proposed speech recognition techniques can be provided as a cloud service available to various users of cloud-based machine learning platform. For example, a user can supply or otherwise identify one or more speech data examples (e.g., streaming recognition speech data, contextual recognition speech data, etc.). The processes described herein can then be performed to automatically perform speech recognition on the example speech data identified by or provided by the user. For example, the speech recognition can be performed in conjunction with model training as a service. The trained model can be provided as an output to the user (e.g., automatically deployed on behalf of or to one or more devices associated with the user).

The present disclosure provides a number of technical effects and benefits. As one example technical effect and benefit, the systems and methods of the present disclosure enable utilization of both streaming and contextual recognition technologies with one multi-mode speech recognition model. Both streaming and contextual speech recognition are heavily utilized in a number of cutting edge technologies (e.g., human-computer understanding, voice recognition, semantic understanding, transcription, etc.). As such, the designing, training, storing, and utilizing of models for each mode has previously been required. However, the present disclosure obviates the need to use two or more models for various speech recognition contexts, therefore significantly reducing the substantial computational costs (e.g., power, memory, storage, processing time, resource utilization, etc.) associated with designing, training, validating, and storing an additional model for speech recognition. Additionally, the dual-mode nature reduces the complexity inherent to utilizing two separate models (e.g., deployment, maintenance, monitoring, etc. of two separate models), therefore significantly increasing user friendliness and reducing the overhead associated with utilization of two models.

As another example technical effect and benefit, the systems and methods of the present disclosure enable further improvements to streaming speech recognition. For example, by jointly training the machine-learned multi-mode speech recognition model in the contextual and streaming recognition modes, the relatively higher accuracy of the contextual recognition mode can be utilized as a distillation training signal for the streaming recognition mode. In such fashion, the performance (e.g., emission latency, word accuracy, etc.) of the streaming recognition mode can be improved without any additional processing cost (e.g., utilizing a separate model as a distillation training signal, etc. These improvements to streaming recognition performance can reduce the number of inaccurate word predictions, therefore saving a number of resources associated with additional processing or incorrect predictions (e.g., memory usage, network bandwidth usage, etc.).

Example Devices and Systems

FIG. 1A depicts a block diagram of an example computing system 100 that performs multi-mode speech recognition. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned multi-mode speech recognition models 120. For example, the machine-learned multi-mode speech recognition models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned multi-mode speech recognition models 120 are discussed with reference to FIGS. 1-3.

In some implementations, the one or more machine-learned multi-mode speech recognition models 120 can be received from the server computing system 130 over network 180, stored in the user computing device memory 114, and then used or otherwise implemented by the one or more processors 112. In some implementations, the user computing device 102 can implement multiple parallel instances of a single machine-learned multi-mode speech recognition model 120 (e.g., to perform parallel machine-learned multi-mode speech recognition across multiple instances of the machine-learned multi-mode speech recognition model).

More particularly, the machine-learned multi-mode speech recognition model 120 can be configured to operate in two modes: a streaming recognition mode or a contextual recognition mode. The streaming recognition mode can be configured to separately and/or iteratively encode portions of speech data to obtain streaming prediction data (e.g., online encoding of a sentence included in the speech data word-by-word as it is spoken/streamed, etc.). On the other hand, the contextual recognition mode can be configured to concurrently encode the portions of the speech data to obtain contextual prediction data (e.g., offline encoding all portions of the speech data concurrently, etc.). The machine-learned multi-mode speech recognition model 120 can encode speech data using either mode, and can switch between modes based on the speech recognition task associated with the speech data (e.g., processing a virtual assistant task using the streaming recognition mode, processing a video captioning task using the contextual recognition mode, etc.). In such fashion, the machine-learned multi-mode speech recognition model 120 can be utilized to perform both streaming and contextual speech recognition, therefore eliminating the need to design, train, and utilize separate models for various modes of speech recognition.

Additionally or alternatively, one or more machine-learned multi-mode speech recognition models 140 can be included in or otherwise stored and implemented by the server computing system 130 that communicates with the user computing device 102 according to a client-server relationship. For example, the machine-learned multi-mode speech recognition models 140 can be implemented by the server computing system 140 as a portion of a web service (e.g., a speech recognition service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned multi-mode speech recognition models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned multi-mode speech recognition models 120 and/or 140 based on a set of training data 162. The training data 162 can include, for example, speech data and an associated ground truth label. The speech data can be training data, and can include a plurality of portions (e.g., segments of the speech data, etc.). As an example, each portion of the speech data may include one or more unit(s) of language (e.g., phoneme(s), grapheme(s), word(s), letter(s), etc.). Additionally, or alternatively, the speech data can be apportioned based on time (e.g., a plurality of tokens corresponding to various time segments, etc.). Additionally, the ground truth label associated with the speech data can be a textual representation of any speech included in the speech data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes audio data representing a spoken utterance and the task is a speech recognition task. The output may comprise a text output which is mapped to the spoken utterance.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
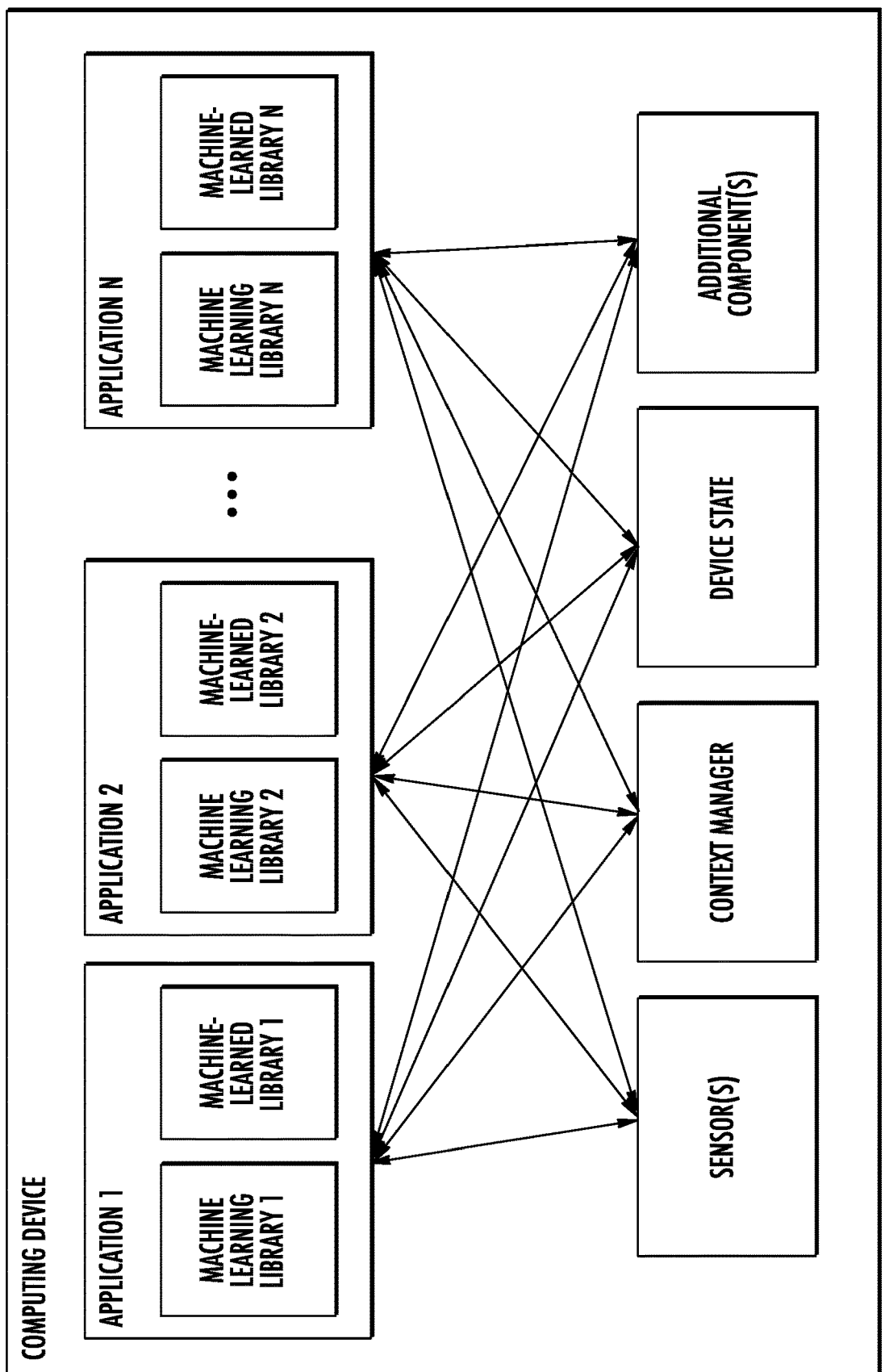
FIG. 1B depicts a block diagram of an example computing device that performs multi-mode speech recognition according to examples described in the present disclosure.

FIG. 1B depicts a block diagram of an example computing device 10 that performs multi-mode speech recognition. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
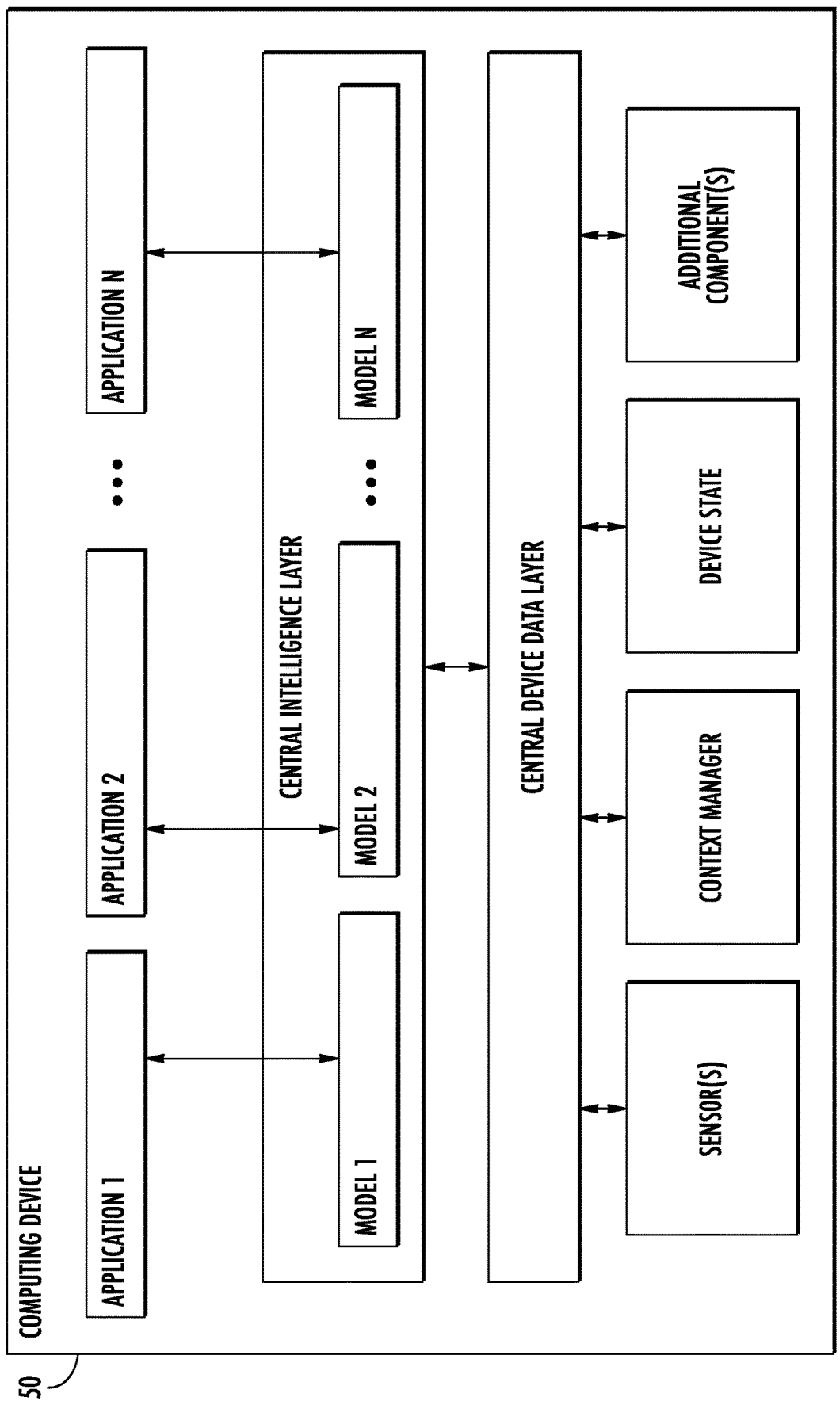
FIG. 1C depicts a block diagram of an example computing device that performs training of a machine-learned multi-mode speech recognition model according to examples described in the present disclosure.

FIG. 1C depicts a block diagram of an example computing device 50 that performs training of a machine-learned multi-mode speech recognition model. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
FIG. 2 depicts a block diagram of an example machine-learned multi-mode speech recognition model according to examples described in the present disclosure.

FIG. 2 depicts a block diagram of an example machine-learned multi-mode speech recognition model 200. In some implementations, the machine-learned multi-mode speech recognition model 200 is trained to receive a set of input data 204 descriptive of speech data and, as a result of receipt of the input data 204, provide output data 206 that transcribes or otherwise encodes the input data 204. As an example, the machine-learned multi-mode speech recognition model 200 can be configured to operate in two modes: a streaming recognition mode or a contextual recognition mode. The streaming recognition mode can be configured to separately and/or iteratively encode portions of speech data 204 to obtain streaming prediction data (e.g., online encoding of a sentence included in the speech data word-by-word as it is spoken/streamed, etc.). On the other hand, the contextual recognition mode 204 can be configured to jointly and/or concurrently encode the portions of the speech data to obtain contextual prediction data (e.g., offline encoding all portions of the speech data concurrently, etc.). The machine-learned multi-mode speech recognition model 200 can encode the speech data 204 using either mode, and can switch between modes based on the speech recognition task associated with the speech data 204 (e.g., processing a virtual assistant task using the streaming recognition mode, processing a video captioning task using the contextual recognition mode, etc.). Based on the machine-learned multi-mode speech recognition model 200 can obtain output data 206 that describes, indicates, and/or transcribes the content of input data 204.

Figure 3:
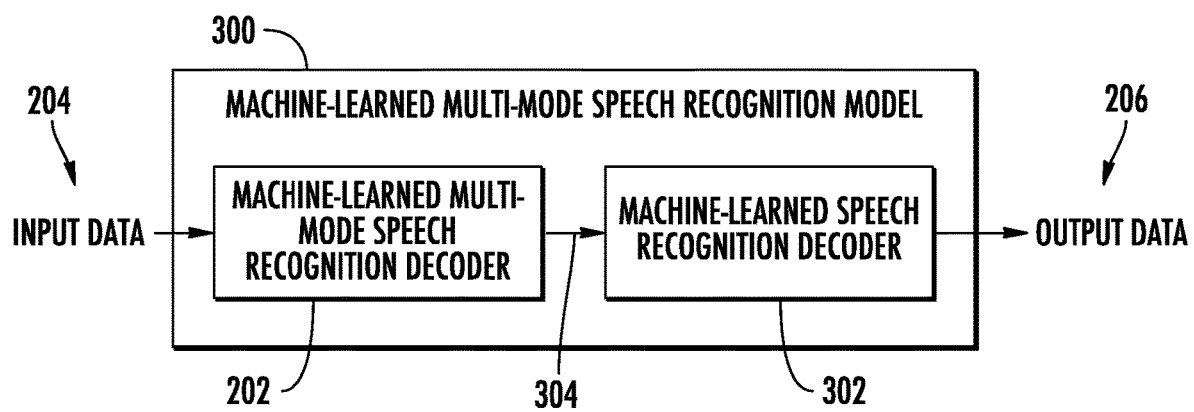
FIG. 3 depicts a block diagram of an example machine-learned multi-mode speech recognition encoder/decoder model according to examples described in the present disclosure.

FIG. 3 depicts a block diagram of an example machine-learned multi-mode speech recognition encoder/decoder model 300. The machine-learned multi-mode speech recognition model 300 is similar to machine-learned multi-mode speech recognition model 200 of FIG. 2 except that machine-learned multi-mode speech recognition model 300 further includes a machine-learned multi-mode speech recognition encoder 202 and a machine-learned multi-mode speech recognition decoder 302. As an example, the machine-learned multi-mode speech recognition encoder 202 can be an encoder of the machine-learned multi-mode speech recognition model 300, and can generate an encoding 304 that is or otherwise includes speech prediction data (e.g., streaming prediction data, contextual prediction data, etc.). The machine-learned multi-mode speech recognition decoder 302 can be a decoder portion of the machine-learned multi-mode speech recognition model. The machine-learned multi-mode speech recognition decoder 302 can process the speech prediction data 304 to obtain the output data 206 that is or otherwise includes a speech recognition output.

Figure 4:
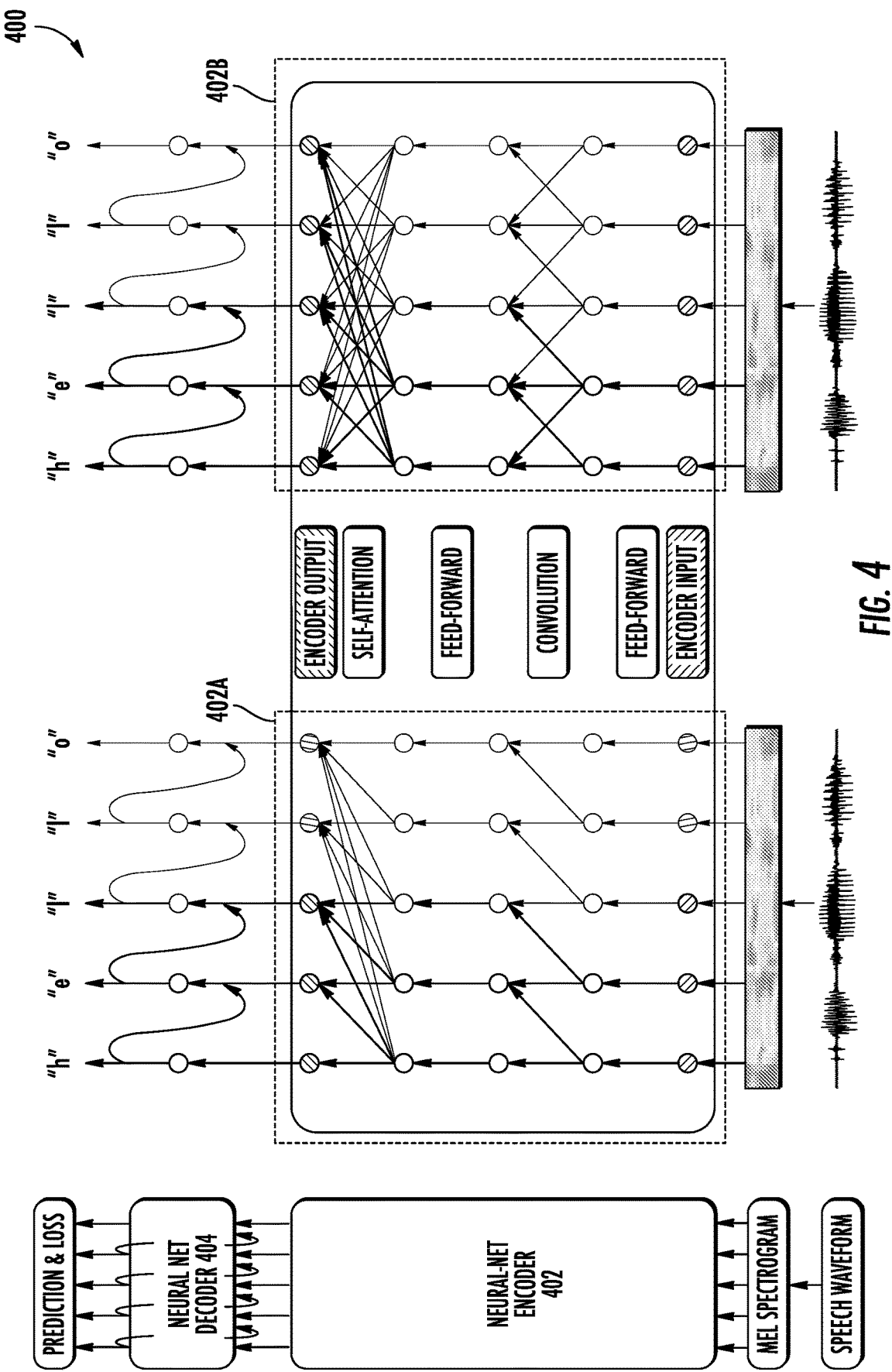
FIG. 4 depicts a data flow diagram of an example machine-learned multi-mode speech recognition model according to examples described in the present disclosure.

FIG. 4 depicts a data flow diagram of an example machine-learned multi-mode speech recognition model 400. As an example, a modern streaming recognition mode 402A and contextual recognition mode 402B of a speech recognition model 402/404 share most of the neural architectures and training recipes in common, with the most significant differences being in the speech recognition encoder 402. Generally, the streaming recognition mode 402A of a neural-net speech recognition encoder 402 are auto-regressive models, with each prediction of the current timestep conditioned on previous ones (no future context). Conversely, the contextual recognition mode of a speech recognition encoder 402 can be fully contextual and non-causal.

Figure 5:
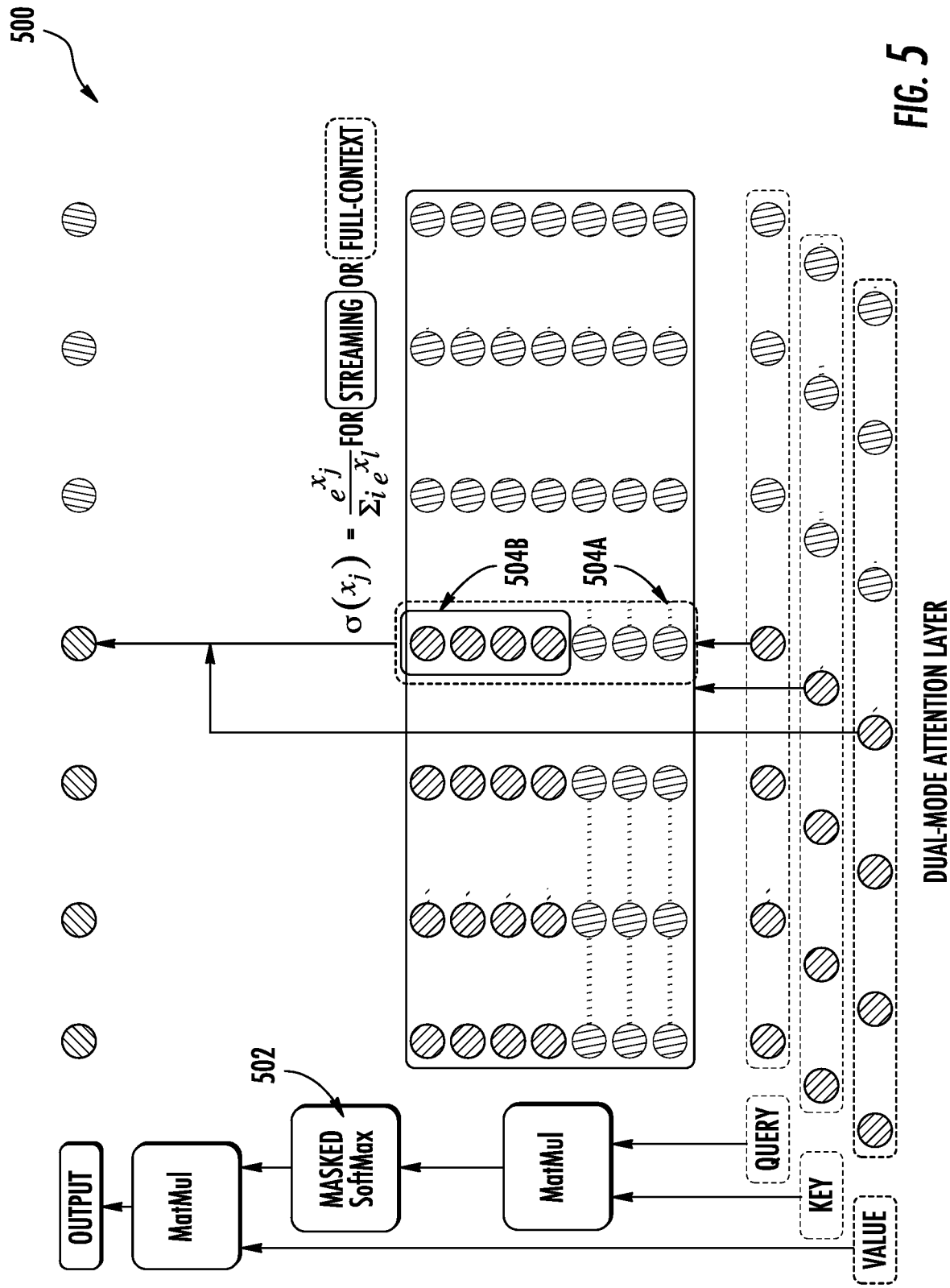
FIG. 5 depicts a data flow diagram of an example dual-mode attention layer of the machine-learned multi-mode speech recognition model according to examples described in the present disclosure.

FIG. 5 depicts a data flow diagram of an example dual-mode attention layer 500 of the machine-learned multi-mode speech recognition model. As depicted, the dual-mode attention layer 500 can include a normalization function 502. Switching the mode of the machine-learned multi-mode speech recognition model from a contextual recognition mode 504A to a streaming recognition mode 504B can include masking one or more inputs to the normalization function. For example, by switching from mode 504A to 504B, one or more of the inputs are masked by the masked softmax normalization function 502

Figure 6:
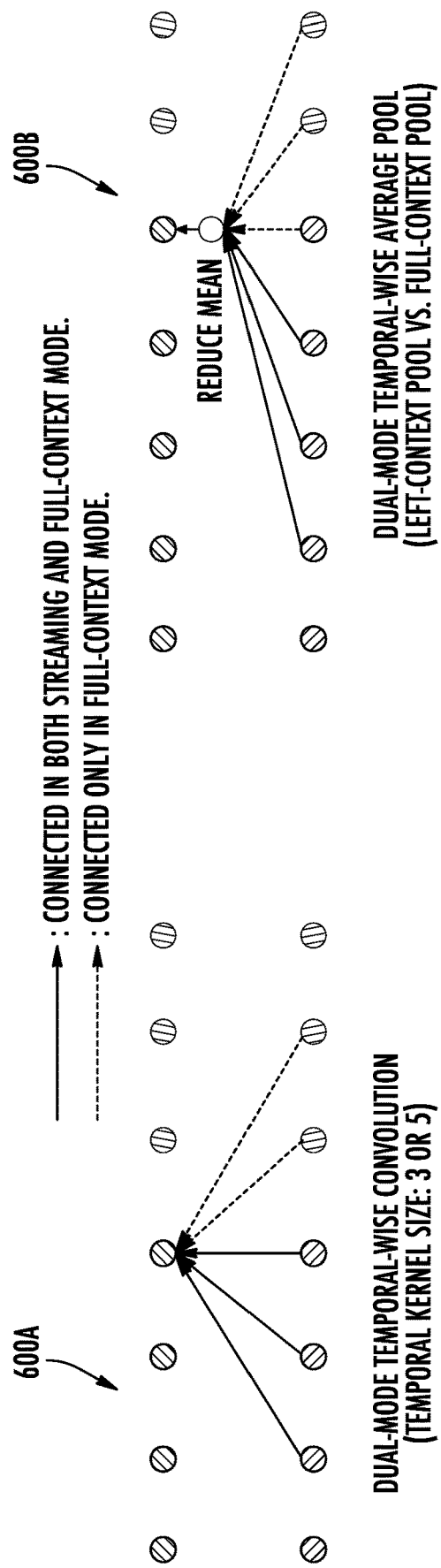
FIG. 6 depicts a data flow diagram of an example dual-mode convolution layer and an example dual-mode pooling layer of the machine-learned multi-mode speech recognition model according to examples described in the present disclosure

FIG. 6 depicts a data flow diagram of an example dual-mode convolution layer 600A and an example dual-mode pooling layer 600B of the machine-learned multi-mode speech recognition model.

As an example, To support the dual-mode nature of the dual-mode convolution layer 600A (e.g., streaming and contextual modes with shared weights, etc.), a normal convolution of kernel size k can be constructed that can be applied in the contextual recognition mode. Next, the causal convolution of kernel size (k+1)/2 can be mimiced by constructing a Boolean mask and multiplying with the dual-mode convolution layer 600A before applying the kernel in the streaming recognition mode. The dual-mode convolution layer 600A can include (k−1)/2 additional parameters to support full-context convolution (k). In comparison, a streaming mode convolution layer can include ((k+1)/2) parameters. Although this can introduce parameter overhead in comparison to a standardized convolutional layer, it should be noted that in convolution-based models, these temporal-wise convolution layers only take a tiny amount of total model size (e.g., most of the weights are on 1×1 convolution layers which are pointwise operators, etc.). As such, any parameter overhead introduced through utilization of the dual-mode convolution layer 600A can be considered negligible.

As another example, the dual-mode pooling layer 600B can include one or more nodes (e.g., a sequential stack of average pooling (through time) layers, feed-forward layers, activation layers, another feed-forward layer, elementwise multiplication layer(s), etc.). To support both modes, the connections between the one or more nodes of the dual-mode pooling layer 600B can be adjusted. As an example, the connections between a first node (e.g., a feed-forward layer, etc.) and a subsequent convolutional layer (e.g., layer 600A) can be adjusted to instead connect to a different node of the dual-mode pooling layer 600B. It should be noted that the dual-mode pooling layer 600B can, in some implementations, be parameter-free, thus avoiding the introduction of additional model size. The dual-mode pooling layer 600B can, in some implementations, be trained in parallel in streaming mode, and can easily be implemented (e.g., with a "cumsum" function in TensorFlow, PyTorch, etc.).

Example Methods

Figure 7:
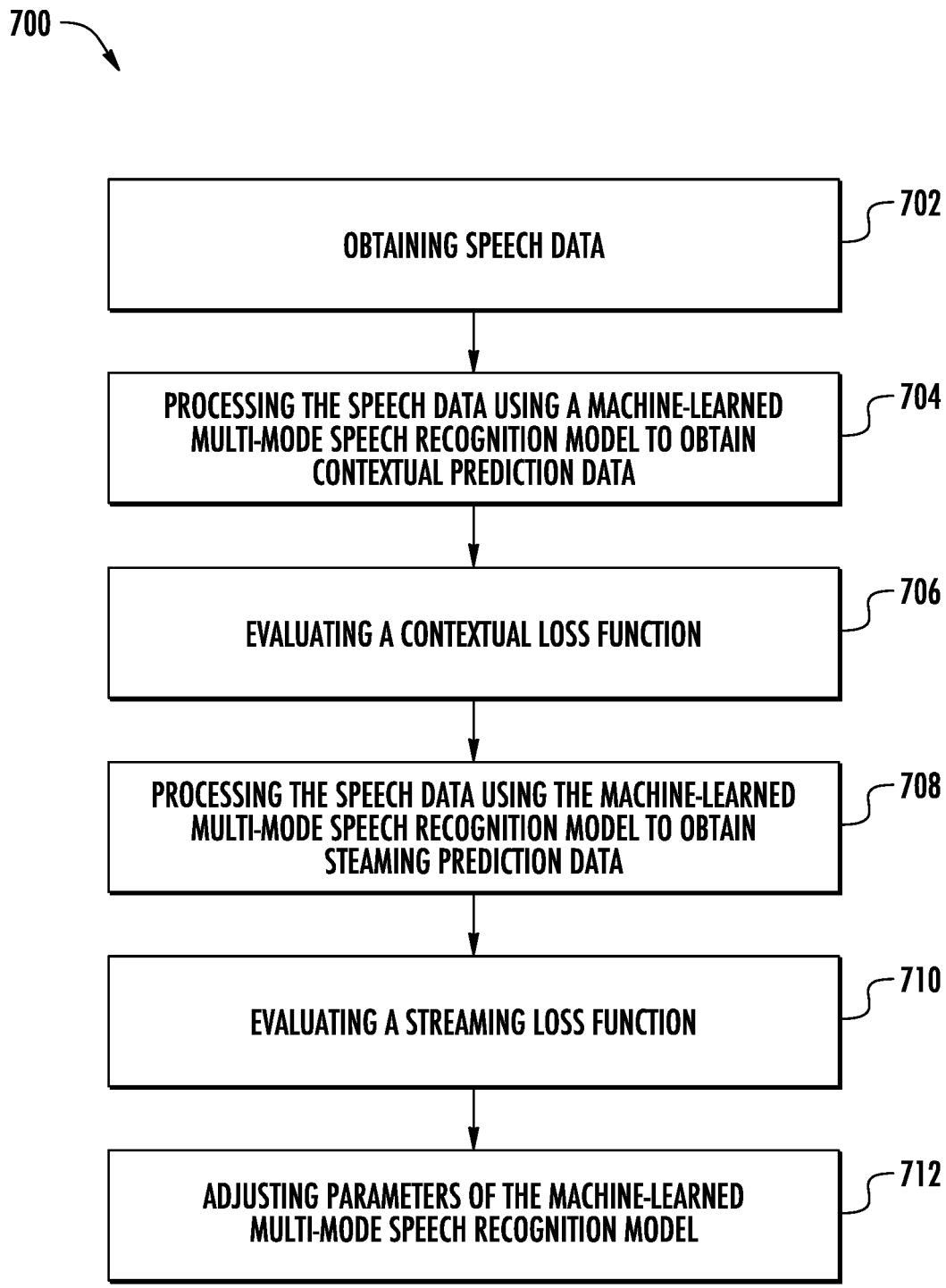
FIG. 7 depicts a flow chart diagram of an example method to perform training of a machine-learned multi-mode speech recognition model according to examples described in the present disclosure.

FIG. 7 depicts a flow chart diagram of an example method 700 to perform training of a machine-learned multi-mode speech recognition model. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure. Further, it will be appreciated that while FIG. 7 represents one example method to perform training of a multi-mode speech recognition model, other methods of training such models are possible. The use of a multi-mode speech recognition model as described herein is not predicated on training the model in accordance with the example depicted in FIG. 7.

At 702, a computing system can obtain speech data. More particularly, the computing system can obtain speech data and an associated ground truth label. The speech data can be training data, and can include a plurality of portions (e.g., segments of the speech data, etc.). As an example, each portion of the speech data may include one or more unit(s) of language (e.g., phoneme(s), grapheme(s), word(s), letter(s), etc.). Additionally, or alternatively, the speech data can be apportioned based on time (e.g., a plurality of tokens corresponding to various time segments, etc.). Additionally, the ground truth label associated with the speech data can be a textual representation of any speech included in the speech data.

At 704, the computing system can process the speech data using a machine-learned multi-mode speech recognition model to obtain contextual prediction data. More particularly, the computing system can process the speech data using a contextual recognition mode of the machine-learned multi-mode speech recognition model to obtain contextual prediction data. The contextual prediction data can be or otherwise include a predicted textual transcription of the speech included in the speech data. For example, the speech data can include a sentence spoken by a user to a virtual assistant application, and the contextual prediction data can include a predicted textual transcription of the sentence. It should be noted that the contextual prediction data can be based on a non-causal (e.g., fully contextual) understanding of the sentence. More particularly, the processing of each portion of the speech data can be based at least in part on any other portion of the speech data.

More particularly, the computing system can include the machine-learned multi-mode speech recognition model. The machine-learned multi-mode speech recognition model (e.g., an encoder, encoder and decoder, etc.) can be or otherwise include one or more neural networks (e.g., deep neural networks) or the like. Neural networks (e.g., deep neural networks) can be feed-forward neural networks, convolutional neural networks, recurrent neural networks (e.g., RNN-T, etc.), and/or various other types of neural networks. As an example, the machine-learned multi-mode speech recognition model can include a plurality of machine-learned layers. These layers can include pointwise operators (e.g., feed-forward net(s), residual connections, activation layers, striding layers, dropout layers, etc.), convolution layer(s), recurrent neural network layer(s), long short-term memory layer(s), average pooling layer(s), self-attention layer(s), transformer layer(s), and/or normalization layer(s).

The machine-learned multi-mode speech recognition model can be configured to operate in a streaming recognition mode or a contextual recognition mode. The streaming recognition mode can be configured to separately and/or iteratively encode each of one or more portions of speech data to obtain streaming prediction data (e.g., to process speech data in a non-causal manner, etc.). As an example, the streaming recognition mode can separately and/or iteratively encode the speech data in an auto-regressive manner, with each prediction of the current portion of speech data conditioned on previous portion predictions(e.g., no future speech portion/context is considered when processing a portion of the speech data, etc.).

The contextual recognition mode can be configured to jointly and/or concurrently encode each of the one or more portions of the speech data to obtain contextual prediction data. More particularly, the contextual recognition mode can process each portion of the speech data concurrently so that the processing of any speech portion can affect the processing of another speech portion (e.g., processing the speech data in a causal manner, etc.). As an example, the contextual recognition mode can jointly and/or concurrently encode the speech data in a parallelized manner, with each prediction of the current portion of speech data conditioned on previous portion predictions and future portion predictions (e.g., both past and future speech portion/context is considered when processing a portion of the speech data, etc.).

It should be noted that in some implementations, the machine-learned multi-mode speech recognition model can be an encoder portion of an overall model. As an example, the machine-learned multi-mode speech recognition model can be an encoder of a machine-learned model, and generate an encoding that is or otherwise includes speech prediction data (e.g., streaming prediction data, contextual prediction data, etc.). A decoder of the machine-learned model can process the speech prediction data to obtain a speech recognition output. Alternatively, in some implementations, the machine-learned multi-mode speech recognition model can be or otherwise include an encoder-decoder architecture.

In some implementations, each layer of the machine-learned multi-mode speech recognition model can be a streaming layer or a dual-mode layer. A streaming layer can be configured to operate in the streaming recognition mode, and the dual-mode layer can be configured to operate in either the streaming recognition mode or the contextual recognition model. It should be noted that as the streaming layer does not operate in two modes, a streaming layer does necessarily need to be adjusted or reconfigured when switching modes of the machine-learned multi-mode speech recognition model. More particularly, the functionality of a streaming layer can be agnostic to the currently configured mode of the model, and therefore can be held static regardless of the current mode of the model.

In some implementations, a dual-mode layer can be configured to operate in either the streaming recognition mode (e.g., a non-causal mode, etc.) or a contextual recognition mode (e.g., a non-causal mode, etc.). As an example, the machine-learned multi-mode speech recognition model and each of the dual-mode layers can be configured to operate in the streaming recognition mode. The machine-learned multi-mode speech recognition model can determine the contextual recognition mode as the selected mode (e.g., based on the speech recognition task associated with additional speech data, etc.). In response, each of the dual-mode layers can be switched from the streaming recognition mode to the contextual recognition mode to facilitate contextual recognition using the machine-learned multi-mode speech recognition model.

As an example, at least one dual-mode layer can be or otherwise include a dual-mode convolutional layer. To support the dual-mode nature of the convolutional layer (e.g., streaming and contextual modes with shared weights, etc.), a normal convolution of kernel size k can be constructed that can be applied in the contextual recognition mode. Next, the causal convolution of kernel size (k+1)/2 can be mimiced by constructing a Boolean mask and multiplying with the full-context convolution kernel before applying the kernel in the streaming recognition mode. The dual-mode convolutional layer can include (k−1)/2 additional parameters to support full-context convolution (k). In comparison, a streaming mode convolution layer can include ((k+1)/2) parameters. Although this can introduce parameter overhead in comparison to a standardized convolutional layer, it should be noted that in convolution-based models, these temporal-wise convolution layers only take a tiny amount of total model size (e.g., most of the weights are on 1×1 convolution layers which are pointwise operators, etc.). As such, any parameter overhead introduced through utilization of a dual-mode convolutional layer can be considered negligible.

As another example, at least one dual-mode layer can be or otherwise include a dual-mode pooling layer. A dual-mode pooling layer can include one or more nodes (e.g., a sequential stack of average pooling (through time) layers, feed-forward layers, activation layers, another feed-forward layer, elementwise multiplication layer(s), etc.). To support both modes, the connections between the one or more nodes can be adjusted. As an example, the connections between a first node (e.g., a feed-forward layer, etc.) and a subsequent convolutional layer can be adjusted to instead connect to a different node of the dual-mode pooling layer. It should be noted that the dual-mode average pooling layer can, in some implementations, be parameter-free, thus avoiding the introduction of additional model size. The dual-mode pooling layer can, in some implementations, be trained in parallel in streaming mode, and can easily be implemented (e.g., with a "cumsum" function in TensorFlow, PyTorch, etc.).

As another example, at least one dual-mode layer can be or otherwise include a dual-mode attention layer. Self-attention (e.g., intra-attention, etc.) can be considered an attention mechanism weighting different positions of a single sequence in order to compute a representation of the same sequence. Additionally, the attention layer itself is parameter-free, and can be composed of matrix multiplication of a key and a query. This multiplication can, in some implementations, be followed by a softmax normalization function processed over the keys, before another matrix multiplication with the value. In a streaming recognition mode, the dual-mode attention layer can perform a normalization (e.g., a softmax, etc.) on the "left" context only (e.g., calculating self-attention only from portions of the speech data that have already been processed, etc.). Conversely, in a contextual recognition mode, the normalization can be performed across the entire context of the speech data (e.g., calculating self-attention from every portion of the speech data, etc.).

As another example, at least one dual-mode layer can be or otherwise include a dual-mode normalization layer. A streaming normalization function and a contextual normalization function can be instantiated for the dual-mode normalization layer. Based on the mode of the machine-learned multi-mode speech recognition model, one of the two normalization functions can be used. In such fashion, a dual-mode normalization layer can switch between normalization functions based on the switching of modes of the machine-learned multi-mode speech recognition model (e.g., switching from a batchnorm function to a layernorm function, etc.).

It should be noted that any pointwise operator can be or otherwise be included as a dual-mode layer. A pointwise operator can be or otherwise include a neural network layer that connects input and output neurons within each timestep (e.g., exclusion of across-connections among different timesteps, etc.). For example, these layers can include feed-forward layers, fully-connected layers, 1×1 convolution layers, activation layers (e.g., ReLU, Swish, residual and dense connections, striding layers, dropout layers, elementwise multiplications, etc. Additionally, a number of these layers can be or otherwise be included in a convolutional transformer portion of the machine-learned multi-mode speech recognition model. The convolutional transformer portion can, for example, include a number of dual-mode layers, such as a first half of a feed-forward layer, a multi-head self-attention layer, a convolutional layer, a second half of a feed-forward layer, etc.

At 706, the computing system can evaluate a contextual loss function. More particularly, the computing system can evaluate a contextual loss function can be evaluated that evaluates a difference between the contextual prediction data and the ground truth label. The contextual loss function can be or otherwise include a variety of loss function(s), such as mean squared error, likelihood loss, cross entropy loss, hinge loss, and/or various other loss functions.

At 708, the computing system can process the speech data using the machine-learned multi-mode speech recognition model to obtain streaming prediction data. More particularly, the computing system can process the speech data using the streaming recognition mode of the machine-learned multi-mode speech recognition model to obtain streaming prediction data. The streaming prediction data can be or otherwise include a predicted textual transcription of the speech included in the speech data in the same manner as the contextual prediction data. It should be noted that the contextual prediction data can be based on a causal (e.g., non-contextual) understanding of the sentence. More particularly, the processing of each portion of the speech data can be based only on portion(s) of the speech data that have already been processed, as described previously.

At 710, the computing system can evaluate a streaming loss function. More particularly, the computing system can evaluate a streaming loss function that evaluates a difference between the streaming prediction data and the ground truth label. Further, the streaming loss function can evaluate a difference between the streaming prediction data and the contextual prediction data. The streaming loss function can be or otherwise include a variety of loss function(s), such as mean squared error, likelihood loss, cross entropy loss, hinge loss, and/or various other loss functions.

At 712, the computing system can adjust parameters of the machine-learned multi-mode speech recognition model. More particularly, the computing system can adjust one or more parameters of the machine-learned multi-mode speech recognition model based at least in part on the contextual loss function and the streaming loss function. For example, the two loss functions can be backpropagated through the model(s) to update one or more parameters of the model(s) (e.g., based on a gradient of the loss function). Gradient descent techniques can be used to iteratively update the parameters over a number of training iterations. Alternatively, in some implementations, the two loss functions can be processed to generate a final loss (e.g., added, averaged, concatenated, etc.), which can be used to adjust the parameter(s) of the model.

More particularly, to train the machine-learned multi-mode speech recognition model given a batch of data in each training iteration, in some implementations one from two model modes can be randomly sampled for training. Alternatively in some implementations, both modes can be trained, and both losses can be aggregated. In the former approach, referred as randomly sampled training, the importance of the streaming recognition mode and the contextual recognition mode can be controlled by setting different sampling probabilities during training. In the latter approach, referred as joint training, importance can also be controlled by assigning different loss weights to balance streaming recognition and contextual recognition modes.

Additionally, as described previously, the knowledge from contextual recognition mode (e.g., a "teacher" mode, etc.) can be distilled into the streaming recognition mode (e.g., a "student" mode, etc.) dynamically within the same universal model (e.g., inplace knowledge distillation, etc.). This distillation can be accomplished through evaluation of the differences between the contextual prediction data and the streaming prediction data by the streaming loss function (e.g., encouraging consistency of predicted token probabilities, etc.). As each iteration generally requires computation of predictions in both modes, the "teacher's" prediction (e.g., the contextual prediction data, etc.) can be utilized without any additional computation or memory cost. This efficient knowledge distillation can be utilized as a KL-divergence between contextual recognition mode (e.g., the "teacher") and the streaming recognition mode (e.g., the "student") over the probability of three parts: $P_{label}$, $P_{blank}$ and $1-P_{label}-P_{blank}$. Generally, the prediction of contextual recognition mode has a lower latency, as the mode has no incentive to delay its output. Thus, the prediction generated by the contextual recognition mode may not necessarily align in time with the streaming mode. As such, time slackness can be utilized by shifting the prediction of the contextual recognition mode one or more frames to the right, therefore improving quality and training stability.

In some implementations, the computing system can obtain additional speech data that corresponds to a speech recognition task (e.g., a transcription task, a closed captioning task, a virtual assistant task, a security recognition task, a speech analysis task, a bandwidth constrained task, a latency-constrained task, a voice recognition task, etc.). Based on the speech recognition task, a selected mode can be determined from the streaming recognition mode and the contextual recognition mode of the machine-learned multi-mode speech recognition model. As an example, the speech recognition task can be associated with a speech instruction received at a virtual assistant device. Based on the task, the selected mode can be determined to be the streaming recognition mode. As an example, the speech recognition task can be associated with an offline transcription of a newly released movie for captioning. Based on the task, the selected mode can be determined to be the contextual recognition mode. The additional speech data can be processed using the selected mode of the machine-learned multi-mode speech recognition model to obtain a speech recognition output.

In some implementations, the computing system can, in response to obtaining the speech recognition output, perform one or more actions based at least in part on the speech recognition output. As an example, if the speech recognition output includes a transcription of instruction(s) to a virtual assistant application, the virtual assistant application can perform or be instructed to perform the transcribed instruction(s) (e.g., to add a calendar entry, to return the current time or weather, etc.). As another example, if the speech recognition output includes captions for an audio file associated with a video, the computing system can provide the captions to a video display application so that the captions can be overlaid on top of the video. As such, the computing system can perform any action associated with the speech recognition task to facilitate completion of the speech recognition task.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for utilization of a multi-mode speech recognition model, comprising:
    obtaining, by a computing system comprising one or more computing devices, a machine-learned multi-mode speech recognition model configured to operate in both a streaming recognition mode and a contextual recognition mode, wherein the machine-learned multi-mode speech recognition model is configured to switch between the streaming recognition mode and the contextual recognition mode, wherein the streaming recognition mode is configured to iteratively encode each of one or more portions of speech data, and wherein the contextual recognition mode is configured to concurrently encode each of the one or more portions of the speech data;
    obtaining, by the computing system, speech data that corresponds to a speech recognition task;
    determining, by the computing system based on the speech recognition task, a selected mode from the streaming recognition mode and the contextual recognition mode of the machine-learned multi-mode speech recognition model; and
    processing, by the computing system, the additional speech data using the selected mode of the machine-learned multi-mode speech recognition model to obtain a speech recognition output.

2. The computer-implemented method of claim 1, wherein the machine-learned multi-mode speech recognition model comprises a plurality of layers, wherein each layer comprises a streaming layer configured to operate in the streaming recognition mode or a dual-mode layer configured to selectively operate in the streaming recognition mode and the contextual recognition modes.

3. The computer-implemented method of claim 2, wherein at least one dual-mode layer comprises a dual-mode convolutional layer comprising a convolutional kernel, and wherein switching the mode comprises applying a mask to the convolutional kernel.

4. The computer-implemented method of claim 1, wherein the selected mode comprises the contextual recognition mode, and wherein the speech recognition task comprises:
    a transcription task;
    a closed captioning task; or
    a speech analysis task.

5. The computer-implemented method of claim 1, wherein the selected mode comprises the streaming recognition mode, and wherein the speech recognition task comprises:
    a bandwidth-constrained task;
    a latency-constrained task;
    a voice recognition task; or
    a virtual assistant task.

6. The computer-implemented method of claim 1, wherein the method further comprises in response to obtaining the speech recognition output, performing, by the computing system, one or more actions based at least in part on the speech recognition output.

7. A computing-implemented method for training a machine-learned model for multi-mode speech recognition:
    wherein the machine-learned multi-mode speech recognition model is configured to operate in both a streaming recognition mode and a contextual recognition mode, wherein the machine-learned multi-mode speech recognition model is configured to switch between the streaming recognition mode and the contextual recognition mode, wherein the streaming recognition mode is configured to iteratively encode each of one or more portions of speech data to obtain streaming prediction data, and wherein the contextual recognition mode is configured to concurrently encode each of the one or more portions of the speech data to obtain contextual prediction data;
    the method comprising:
        obtaining the speech data and an associated ground truth label;
        processing the speech data using the contextual recognition mode of the machine-learned multi-mode speech recognition model to obtain contextual prediction data;
        evaluating a contextual loss function that evaluates a difference between the contextual prediction data and the ground truth label;
        processing the speech data using the streaming recognition mode of the machine-learned multi-mode speech recognition model to obtain streaming prediction data;
        evaluating a streaming loss function that evaluates a difference between the streaming prediction data and the ground truth label and; and
        adjusting one or more parameters of the machine-learned multi-mode speech recognition model based at least in part on the contextual loss function and the streaming loss function.

8. The method of claim 7, wherein the streaming loss function further evaluates a difference between the contextual prediction data and the streaming prediction data.

9. The method of claim 8, wherein evaluating the contextual loss function and the streaming loss function comprises evaluating a loss term comprising a plurality of terms, and wherein the plurality of loss terms comprises:
    a contextual loss term that evaluates the difference between the contextual prediction data and the ground truth label;
    a streaming loss term that evaluates the difference between the streaming prediction data and the ground truth label; and
    a distillation loss term that evaluates the difference between the contextual prediction data and the streaming prediction data.

10. The method of claim 7, wherein the machine-learned multi-mode speech recognition model comprises a plurality of layers, wherein each layer comprises a streaming layer configured to operate in the streaming recognition mode or a dual-mode layer configured to selectively operate in the streaming recognition mode and the contextual recognition mode.

11. The method of claim 10, wherein prior to processing the speech data using the streaming recognition mode the method comprises switching a mode of one or more of the dual-mode layers from the streaming recognition mode to the contextual recognition mode.

12. The method of claim 11, wherein at least one dual-mode layer comprises a dual-mode convolutional layer comprising a convolutional kernel, and wherein switching the mode comprises applying a mask to the convolutional kernel.

13. The method of claim 11, wherein at least one dual-mode layer comprises a dual-mode pooling layer comprising one or more nodes, and wherein switching the mode comprises adjusting a connection of at least one of the one or more nodes to a corresponding node of an adjacent layer of the plurality of layers.

14. The method of claim 11, wherein at least one dual-mode layer comprises a dual-mode attention layer comprising a normalization function, and wherein switching the mode comprises masking one or more inputs to the normalization function.

15. The method of claim 11, wherein at least one dual-mode layer comprises a dual-mode normalization layer comprising a streaming normalization function and a contextual normalization function, wherein the dual-mode normalization layer is configured to utilize the contextual normalization function, and wherein switching the mode comprises reconfiguring the layer to utilize the streaming normalization function.

16. The method of claim 11, wherein a subset of the plurality of layers comprises a convolutional transformer portion, comprising:
    a first half of a feed-forward layer;
    a multi-head self-attention layer;
    a convolutional layer; and
    a second half of a feed-forward layer.

17. The method of claim 7, wherein the method further comprises:
    obtaining additional speech data corresponding to a speech recognition task;
    determining, based on the speech recognition task, a selected mode from the streaming recognition mode and the contextual recognition mode of the machine-learned multi-mode speech recognition model; and
    processing the additional speech data using the selected mode of the machine-learned multi-mode speech recognition model to obtain a speech recognition output.

18. The method of claim 17, wherein the speech recognition task comprises:
    a transcription task;
    a closed captioning task; or
    a virtual assistant task.

19. One or more tangible, non-transitory computer readable media storing computer-readable instructions that when executed by one or more processors cause the one or more processors to perform operations, the operations comprising:
    obtaining a machine-learned multi-mode speech recognition model configured to operate in both a streaming recognition mode and a contextual recognition mode, wherein the machine-learned multi-mode speech recognition model is configured to switch between the streaming recognition mode and the contextual recognition mode, wherein the streaming recognition mode is configured to iteratively encode each of one or more portions of speech data, and wherein the contextual recognition mode is configured to concurrently encode each of the one or more portions of the speech data;
    obtaining speech data that corresponds to a speech recognition task;
    determining, based on the speech recognition task, a selected mode from the streaming recognition mode and the contextual recognition mode of the machine-learned multi-mode speech recognition model; and
    processing the additional speech data using the selected mode of the machine-learned multi-mode speech recognition model to obtain a speech recognition output.

20. The one or more tangible, non-transitory media of claim 19, wherein the selected mode comprises the contextual recognition mode, and wherein the speech recognition task comprises:
    a transcription task;
    a closed captioning task; or
    a speech analysis task.

21. The one or more tangible, non-transitory media of claim 19, wherein the selected mode comprises the streaming recognition mode, and wherein the speech recognition task comprises:
    a bandwidth-constrained task;
    a latency-constrained task;
    a voice recognition task; or
    a virtual assistant task.

* * * * *